United States Patent [19]
Gallucci

[11] 3,949,489
[45] Apr. 13, 1976

[54] PSYCHOLOGICAL TEACHING APPARATUS

[76] Inventor: Frank Gallucci, 22 Maple Ave., Holbrook, N.Y. 11741

[22] Filed: Sept. 23, 1974

[21] Appl. No.: 508,085

[52] U.S. Cl. ................................................. 35/9 C
[51] Int. Cl.² ........................................... G09B 7/06
[58] Field of Search ............ 35/9 C, 9 R, 9 B, 48 R, 35/48 A

[56] References Cited
UNITED STATES PATENTS

| | | | |
|---|---|---|---|
| 2,943,400 | 7/1960 | Griswold | 35/9 C |
| 3,057,082 | 10/1962 | Wellington et al. | 35/9 C |
| 3,100,352 | 8/1963 | Boissevain | 35/9 C |
| 3,209,471 | 10/1965 | Brittan | 35/9 B X |
| 3,471,941 | 10/1969 | Torres | 35/9 R |
| 3,522,665 | 8/1970 | Kalt | 35/9 C |

Primary Examiner—Wm. H. Grieb

[57] ABSTRACT

A psychological teaching apparatus is described having a cover plate and successively therebeneath a question analysis sheet, a spacer plate, an answer key plate, and a series of electrical contacts, a series of aligned holes in said cover plate and spacer plate representative of the questions to be answered and corresponding holes in the answer key plate representative of the answers to such questions, the series of electrical contacts beneath the holes of the answer key plate being connectable with an electrical probe passing through the answer key plate, and a series of lights electrically connected to said probe and said electrical contacts to become actuated upon contact of the probe with each said contact for successive questions.

4 Claims, 3 Drawing Figures

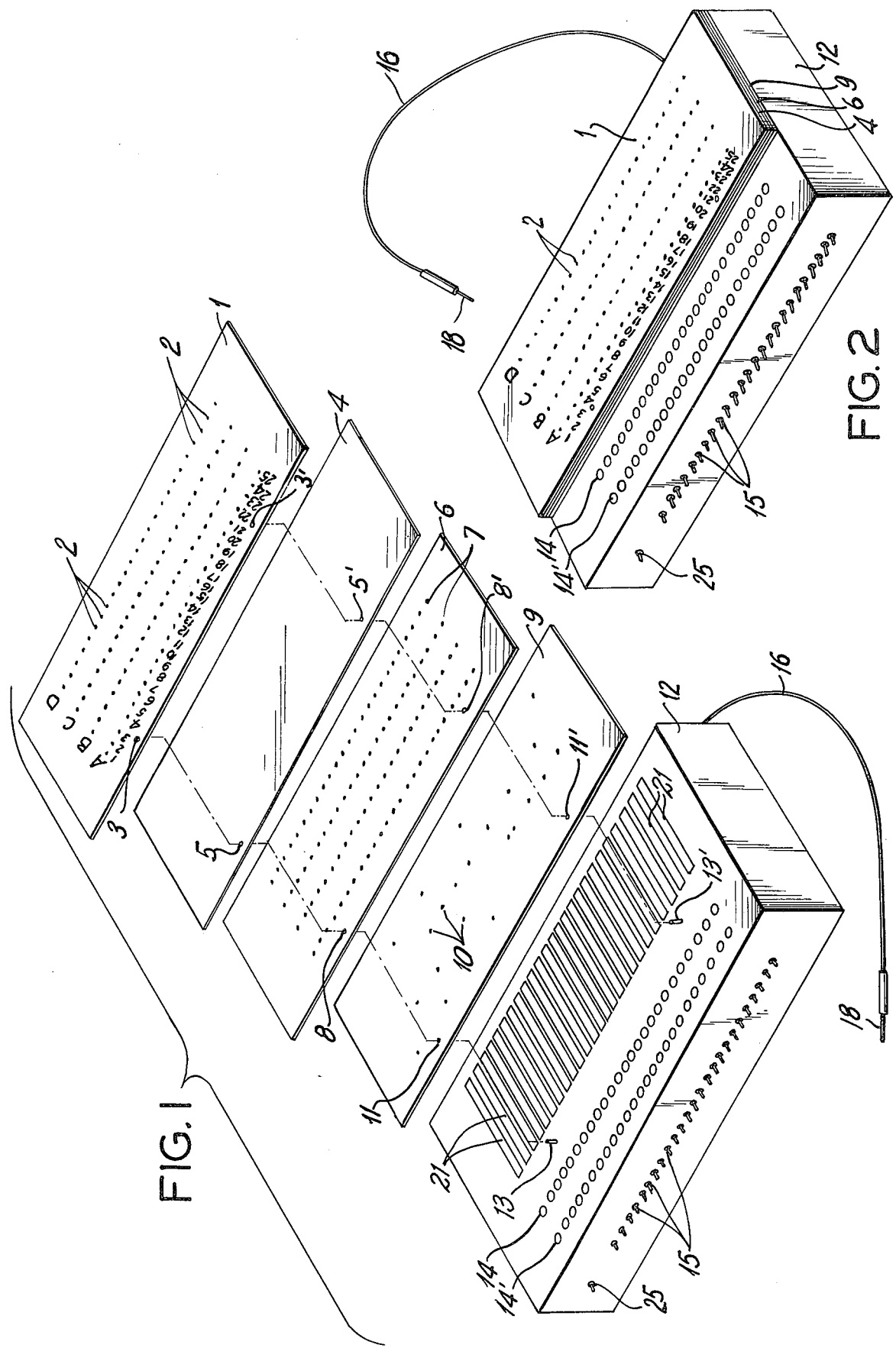

PSYCHOLOGICAL TEACHING APPARATUS

BACKGROUND OF THE INVENTION

This invention relates to a psychological teaching apparatus and more particularly, to an apparatus which is specifically designed to program a series of questions to be answered by a student in such a manner as to give the student an immediate response to the questions which he answers in a particular learning procedure.

There have been many teaching aids proposed in the prior art and many devices developed which record the results of a test to which the student is subjected. Most of these devices however, are primarily concerned with means for recording the results of various testing techniques without regard to giving the student an immediate response to the accuracy of the questions which have been put to him.

One device which is described in U.S. Pat. No. 3,057,082, sets forth means for providing immediate response to, and for recording the results obtained from multiple choice questions presented to a student, but it requires elaborate and expensive printed circuit boards for programming the answers to each series of multiple choice questions. Accordingly, the device referred to is not essentially designed to assist in the teaching of the student, although it can be so used. Rather, it provides a convenient means for recording his achievement in a particular test, especially where large scale testing justifies the expense of printed circuit programming.

SUMMARY OF THE INVENTION

In accordance with the present invention, it has been found that much more advantageous results can be achieved in the teaching of the student by providing a teaching aid or apparatus which, in presenting materials to the student, will give the student an immediate response to the questions on which he is being taught, whether the response be negative or positive, so that the correct answers will register on his mind at the precise time when the student responds and his mind is focusing on those questions, and not at a later date when he may receive an automated grade meaning little or nothing to him in terms of the learning process.

The present invention provides an apparatus for accomplishing the purpose of not only testing a student, but also for teaching him the correct answers to various questions presented to him in a test or while learning original material, so that he will react to those questions in such a manner, as a consequence of various psychological techniques programmed by the teacher, as to remember the mistakes he has made while learning or as he is being tested, and to properly identify the correct answers to the questions. These and other objectives are accomplished in a more simple and economic manner than in the prior art.

DESCRIPTION OF THE PREFERRED EMBODIMENT

The invention will be more fully understood by reference to the accompanying drawings and the more detailed description with respect thereto, wherein:

FIG. 1 is an exploded view of a device designed for the teaching of students in accordance with this invention;

FIG. 2 is a perspective view of the device showing all the elements of FIG. 1 in an assembled position.

Figure 3:
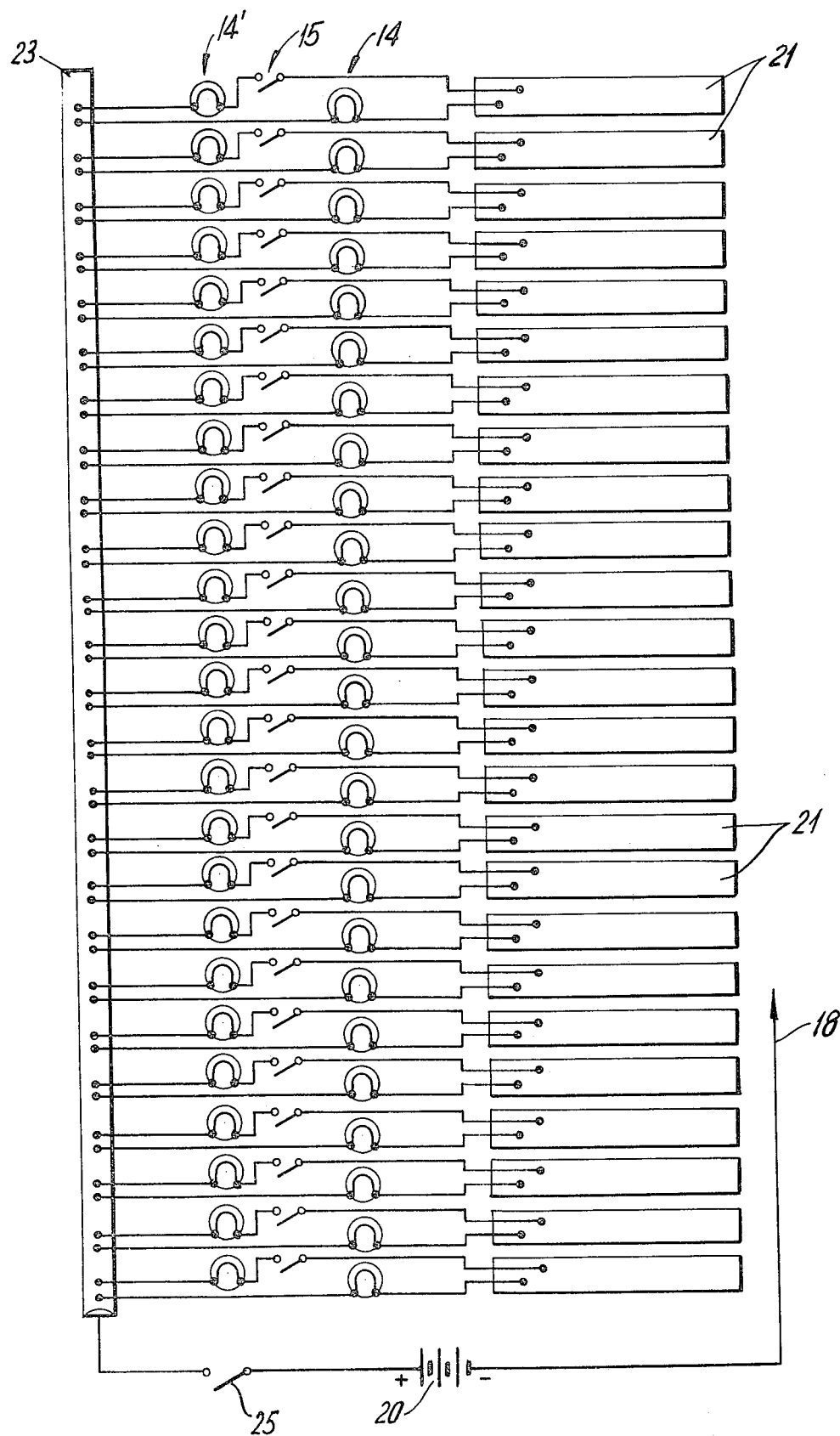
FIG. 3 is an electrical schematic diagram showing an electrical system for providing a succession of light signals to be employed in the device of FIGS. 1 and 2.

Referring to the exploded view of FIG. 1, 1 is a cover plate provided with a plurality of holes 2 for receiving a probe and provided with a succession of holes corresponding to various multiple choice answers (shown as A through D for illustrative purposes). Cover plate 1 is also provided with two alignment holes 3 and 3' for aligning the same with various elements to be described hereinafter.

Beneath cover plate 1, there is provided an item analysis sheet 4, preferably of paper, provided with various indicia (not shown) to indicate the various answers to questions programmed by the teacher. Item analysis sheet 4 also is provided with at least two holes 5 and 5' to align the same with cover plate 1 and the elements to be added therebelow.

Beneath item analysis sheet 4, there is provided a spacer plate 6 also having a series of holes 7 vertically aligned which various holes 2 of cover plate 1, and corresponding in number and position with respect thereto. Spacer plate 6 also contains alignment holes 8 and 8' to align it with the foregoing elements above and those beneath the same.

Beneath spacer plate 6 there is provided an answer key plate 9 having holes 10 programming the desired response schedule to the various questions which are contained in item analysis sheet 4 and also presented to the student in the form of materials to be learned and responses which are to be analyzed. Therefore, holes 10 may be programmed to the incorrect responses, as well as to the correct responses, if desired. Answer key 9 moreover contains at least two alignment holes 11 and 11' to align the same with the foregoing elements.

Each of the foregoing elements is assembled on a base 12 and aligned thereon by pins 13 and 13' to assure that all of the holes of plates 1, 6 and 9 and the indicia on item analysis sheet 4, are properly aligned in a vertical position.

Base 12 is provided with a series of electrical contacts 21 corresponding in number to the number of questions, as will hereinafter be described.

As stated above, item analysis sheet 4 is preferably constructed of paper. However, other materials easily penetrated by a probe may be used. Cover plate 1, spacer plate 6, and answer key 9 may be constructed of rigid material, such as plastic, fiberboard, or metal, as long as the material has sufficient dimensional stability under normal conditions of use to perform the desired functions. The thickness of the material of each plate may vary from approximately from about 1/16th to 1/8th of an inch, but a greater or lesser thickness may be utilized, depending upon the length of the probe to be described hereinafter.

The foregoing plates and analysis sheet are sandwiched to a base 12, as previously described, and containing therein electrical circuits to house preferably two banks of lights 14 and 14' which are designed to give the student an indication of his immediate response to correct answers or, if the programming is such, to incorrect answers. The circuitry for these lights is more precisely illustrated in FIG. 3.

Lights 14 are so designed that they will become illuminated every time a contact is made with a probe 18 passing through the aforesaid plates and connecting the same to a power supply. Lights 14' are so designed that they will become illuminated every time lights 14 become illuminated if a switch 15 is closed to connect any additional light 14' with an individual circuit corresponding to each question, thereby placing both lights 14 and 14' in parallel.

Base 12 is provided with a succession of switches 15 corresponding to the respective questions 1 to 25, more or less, so that each of lights 14' may be connected, at the discretion of the teacher, to increase the brightness of the light which responds to the correct answer where desired. It has been found that the provision of light, either to indicate a correct answer or to indicate a wrong answer (by way of psychological punishment) is extremely important in testing the student and teaching him the difference between the correct and the wrong answer. Thus, the provision of one or more lights for each successive answer in the series of questions posed to the student can be extremely useful to the teacher in his programming of the materials and analysis of the data collected. An electrical lead 16 is also provided, connected with the source of power and to a metallic conductor probe 18 which may be inserted into the various holes of cover plate 1 to penetrate item analysis sheet 4, pass through spacer plate 6 and answer key 9 to contact with the electrical contacts necessary to register a response on lights 14 and 14'. The complete assembled unit of the elements in the exploded view of FIG. 1 is shown in FIG. 2, wherein the various plates and item analysis sheet 4 are sandwiched together in fixed relationship and in readiness for teaching of a student.

Referring now more specifically to FIG. 3, 14 represents the series of lights which are actuated with respect to each correct answer and 14', a series of fortifying lights which, through switches 15, increase the intensity of the light developed through lights 14 if the teacher actuates switches 15 for the respective questions. Lights 14' are thus all independently controllable for each question. It is also not to be excluded that lights 14 may each be individually controlled by a series of additional switches (not shown) in the same manner for example, as lights 14' are controlled.

Both lights are actuated by a power supply 20, which may be battery actuated or actuated by other means through the probe 18 which may be contacted with a series of electrical contacts 21 on the negative side of a battery actuated power supply, completing the circuit through any light 14, or 14 and 14', to a terminal strip 23 connecting all of the terminals of the lights to the positive side of the battery source. A master switch or "kill" switch 25 is also provided to cut off the power to all lights in the event that this is indicated in the judgement of the teacher performing the procedure on a particular student.

The combination of the item analysis sheet 4, spacer plate 6 and answer key 9 is unique in that it forces the student to penetrate the item analysis sheet with probe 18, by virtue of spacer plate 6, whether his answer to a question is correct or incorrect. It thus prevents hit or miss probing of the student to find the correct answer. Without spacer plate 6, corresponding to the holes in cover plate 1, the student would be able to probe through cover plate 1 for the correct answers without penetrating the item analysis sheet, and the teacher would not know how many attempts were necessary to find the correct response. Accordingly, the combination of the spacer plate and answer key beneath the item analysis sheet assures that the student will not be able to cheat and thereby defeat the purpose of a teaching procedure.

The foregoing apparatus may be utilized in a number of ways to assist in the teaching of students.

The item analysis sheet is designed to utilize standard 8½ × 11 loose-leaf paper on which the various questions and answers are programmed. When the probe 18 is inserted into the respective holes, the probe will puncture the item analysis sheet but may be blocked by the answer key plate 9. If it passes therethrough it will make contact with the corresponding electrical contact 21. Thus, every attempted response by the student is recorded on the item analysis sheet. The teacher can then interpret from the item analysis sheet the various conditions which the teacher has established and programmed on that sheet. Consequently, a concise record of the progress of the student is achieved.

The lights 14 and 14' may be employed to provide the student with immediate knowledge as to the nature of this response.

The switches 15 allow the teacher to control the force of the light which is registered when the student answers each question. This may be characterized as a "punishment or reinforcement" response of the student. Therefore, the teacher may through programming of the device fortify the student's reaction to the learning process.

"Kill" switch 25 which deactivates all lights can also be utilized as an important teaching aid since the literature has demonstrated that if reinforcement is always provided immediately when correct response of the student is submitted, a dependence on immediate reinforcement will develop. However, in some cases the student may be benefited by cutting of all power to the lighting system, so that he will be forced to complete the series of questions without the benefit of immediate reinforcement.

In accordance with the present invention there are many programs which can be developed in the answer key. For example, the teaching aid may be programmed so that the student will be reinforced for the correct response immediately through illumination of both lights 14 and 14'. This will in effect provide the student with a "no-light" response for his failure to select the correct answers, but give him psychological reinforcement for the correct answers when he visualizes a "two-light" response. In any event, he will have immediate knowledge as to the nature of his response. The switches allow the teacher to control the ratio of punishment or reinforcement of the responses. Thus, one light glowing singularly can be made to indicate a level of strength of the punishment or reinforcement ratio; the two lights glowing together can be made to indicate twice that ratio. Accordingly, the conditions established by the teacher will define whether the illumination of the lights are a "punishment" or "reinforcement."

As pointed out, the literature demonstrates that if immediate reinforcement is provided in accordance with a correct response by the student, a dependency will develop upon this immediate reinforcement. Thus, this dependency upon immediate feed back must be faded out. Since the "kill" switch 25 will deactivate the power to all of the response lights, the student can be forced to complete an entire series of responses before the data sheet is reviewed and reported to him.

The answer key has the ability to reinforce the correct response immediately upon the student receiving an indication from light source 14 and will also indicate when the student's response was exceptional in view of the teacher's activation, through switches 15, of light source 14'. In this case the answer key is programmed to permit probe 18 to contact plates 21 at only one port of each answer key.

Alternatively, the answer key may be programmed in such a way i.e., by blocking the correct answer from probe 18 as to allow the student to ascertain all responses that will cause the respective lights to become activated, which are all incorrect answers to questions. The student will then discover three non-responsive answers out of four possibilities for any question (A,B,C,D). The wrong responses can thus be programmed to cause one or two of the lights to glow according to the conditions that the teacher may select. This also can have a useful effect upon the student's ability to learn the correct answers.

By increasing the number of ports that are accessible to the probe 18 the student may be asked to respond to any number of permutations and combinations of questions having positive answers or negative answers, consistent with the teacher's programming of the answer key.

Thus it will be seen that a very valuable teaching tool has been provided by the present invention, which may be utilized in many respects to assist in the teaching of students by psychological techniques heretofore not utilized.

Resort may be had to such modifications and equivalents as fall within the spirit of the invention and the scope of the appended claims.

I claim:

1. A psychological teaching apparatus having a base supporting a series of overlying layers comprising:
    a A cover plate provided with multiplicity of holes arranged in lines and at least two columns for indicating a succession of answers to successive questions;
    b An item analysis sheet of paper spaced beneath said cover plate and containing indicia thereon, contiguous thereto and adapted to be punctured by a probe passing through said cover plate;
    c A spacer beneath said item analysis sheet provided with a series of holes therethrough corresponding to and in vertical alignment with said holes in said cover plate;
    d An answer key plate beneath said spacer plate provided with holes corresponding to answers to successive questions programmed thereon;
    e A series of electrical contacts beneath said answer key plate in alignment with each of said holes corresponding to the succession of answers programmed on said answer key plate;
    f A probe connected to a source of power and at least one source of light for penetrating the holes of said cover plate, item analysis sheet, spacer plate, and answer key plate to make contact with said electrical contacts upon selection of the answers to the respective questions on said item analysis sheet and programmed on said answer key plate; and
    g Two sources of light on the top of said base in parallel alignment with each successive line of holes corresponding to programmed answers, the first source of light being provided for each line of holes in said cover plate for illumination each time said probe contacts said electrical contacts corresponding to said line and the second source of light for each line of said holes being controlled by an individual switch for permitting activation of each second source of light, said individual switches being located on a side of said base.

2. An apparatus according to claim 1 wherein the number and position of the holes in said cover plate and spacer plate correspond to one another.

3. An apparatus according to claim 1, wherein said answer key plate is programmed to cause illumination of at least said first source of light upon selection of a correct answer.

4. An apparatus according to claim 1, wherein said answer key plate is programmed to cause illumination of at least said first source of light upon selection of an incorrect answer.

* * * * *